(12) United States Patent
Paulson et al.

(10) Patent No.: US 7,477,649 B2
(45) Date of Patent: Jan. 13, 2009

(54) ACTIVE FIFO THRESHOLD ADJUSTMENT

(75) Inventors: Christopher D. Paulson, Fort Collins, CO (US); Timothy D. Thompson, Windsor, CO (US); Steven A. Schauer, Loveland, CO (US)

(73) Assignee: LSI Corporation, Milpitas, CA (US)

( * ) Notice: Subject to any disclaimer, the term of this patent is extended or adjusted under 35 U.S.C. 154(b) by 1244 days.

(21) Appl. No.: 10/196,824

(22) Filed: Jul. 17, 2002

(65) Prior Publication Data

US 2004/0013123 A1 Jan. 22, 2004

(51) Int. Cl.
*H04L 12/28* (2006.01)
(52) U.S. Cl. ...................................... 370/412
(58) Field of Classification Search ........................ None
See application file for complete search history.

(56) References Cited

U.S. PATENT DOCUMENTS

| | | | | |
|---|---|---|---|---|
| 4,258,418 A | * | 3/1981 | Heath | 710/53 |
| 4,833,651 A | * | 5/1989 | Seltzer et al. | 365/189.07 |
| 4,873,666 A | * | 10/1989 | Lefebvre et al. | 365/189.07 |
| 4,953,157 A | * | 8/1990 | Franklin et al. | 370/230 |
| 5,272,728 A | * | 12/1993 | Ogawa | 375/372 |
| 5,278,956 A | * | 1/1994 | Thomsen et al. | 711/167 |
| 6,044,416 A | * | 3/2000 | Hasan | 710/52 |
| 6,140,946 A | * | 10/2000 | Desrosiers et al. | 341/100 |
| 6,233,629 B1 | * | 5/2001 | Castellano | 710/29 |
| 6,553,503 B1 | * | 4/2003 | Li | 713/401 |

OTHER PUBLICATIONS

Zorian et al, Fault Models and Tests Specific for FIFO Functionality, IEEE, pp. 72-76, 1993.*
Deyring, Serial ATA: High Speed Serialized AT Attachment Specification, Revision 1.0, pp. 1-306, Aug. 2001.*

* cited by examiner

*Primary Examiner*—Frank Duong
(74) *Attorney, Agent, or Firm*—Christopher P. Maiorana, PC

(57) ABSTRACT

An apparatus comprising a first circuit and a second circuit. The first circuit may be configured to store input data in response to a write pointer and present output data in response to a read pointer. The second circuit may be configured to generate a control signal in response to the write pointer, the read pointer and a type of an information packet containing the input data.

22 Claims, 4 Drawing Sheets

ACTIVE FIFO THRESHOLD ADJUSTMENT

FIELD OF THE INVENTION

The present invention relates to data buffering generally and, more particularly, to method and/or apparatus providing active FIFO threshold adjustment.

BACKGROUND OF THE INVENTION

A conventional method for coupling devices that operate at different speeds (or asynchronously from each other) is to use a first-in, first-out (FIFO) memory. To prevent an overflow condition (i.e., where incoming data is written over unread data), the distance between read and write pointers is monitored and data input stopped when the FIFO is almost full (i.e., the write pointer is within a predetermined threshold of the read pointer).

In a serial advanced technology attachment (Serial-ATA) application, a FIFO is used to receive different size information packets from another device. When the FIFO detects an almost full condition, a HOLD is sent to the transmitter. Upon receiving the HOLD, the transmitter stops sending the current information packet until told to begin again by the receiver.

Conventional Serial-ATA devices have receive FIFOs sized large enough so that non-data FIS type payloads can be written without nearing the overflow threshold. However, the large FIFOs require more silicon, thus increasing the cost of the devices.

SUMMARY OF THE INVENTION

The present invention concerns an apparatus comprising a first circuit and a second circuit. The first circuit may be configured to store input data in response to a write pointer and present output data in response to a read pointer. The second circuit may be configured to generate a control signal in response to the write pointer, the read pointer and a type of an information packet containing the input data.

The objects, features and advantages of the present invention include providing a method and/or apparatus providing active FIFO threshold adjustment that may (i) actively adjust assertion of a FIFO threshold, (ii) be more cost effective, (iii) use less area and/or (iv) be employed on any FIFOs that receive information packets having different predetermined sizes.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
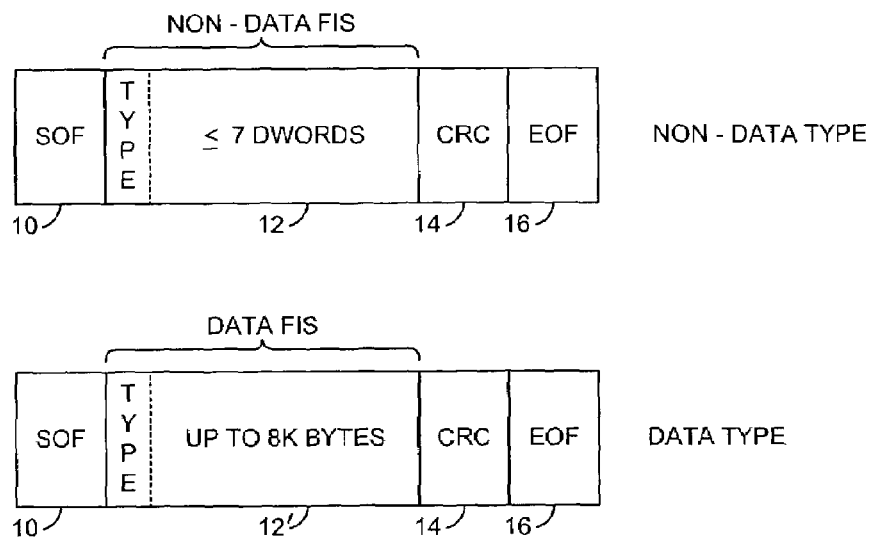
FIG. 1 is a block diagram of a non-DATA type Serial-ATA FIS and a DATA type Serial-ATA FIS.

Referring to FIG. 1, a block diagram of a Serial-ATA non-data type information packet and a Serial-ATA data type information packet is shown. In Serial-ATA, information packets are sent using a frame information structure (FIS). A frame generally includes a start of frame (SOF) delimiter 10, a payload 12, a CRC delimiter 14 and an end of frame (EOF) delimiter 16. The payload 12 may be a non-data FIS type (e.g., register or setup) payload 12 or a data FIS type payload 12'. In general, a first field (e.g., byte 0) of the payloads 12 and 12' contain a value indicating the type of frame information structure (FIS) contained within the frame (e.g., register, setup, data). The non-data FIS type payloads 12 are defined to be seven dwords (or double words) or less in length, while the data FIS type payloads 12' can be up to 8K bytes in length. A dword as used herein is generally defined as thirty-two bits of data. A dword may be represented as 32 bits, as two adjacent words, or as four adjacent bytes. The payloads 12 and 12' may be compliant with the Serial-ATA specification (revision 1.0, published Aug. 29, 2001) which is hereby incorporated by reference in its entirety.

Figure 2:
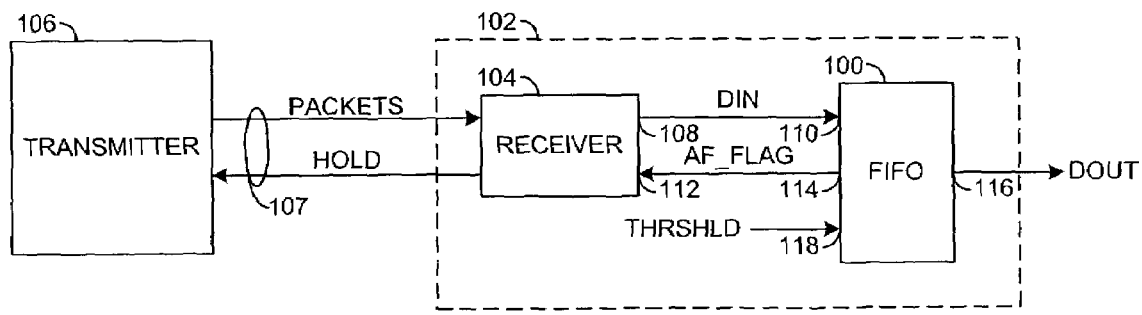
FIG. 2 is a block diagram of a preferred embodiment of the present invention.

Referring to FIG. 2, a block diagram of a circuit 100 is shown in accordance with a preferred embodiment of the present invention. The circuit 100 may be implemented as a first-in, first-out (FIFO) memory. In one example, the circuit 100 may be implemented as a receive FIFO of a Serial-ATA (SATA) device 102. The device 102 may further comprise a receiver circuit 104. The circuit 104 may be configured to couple the device 102 to a transmitter circuit 106 of another SATA device (or host) via, for example, a SATA bus 107.

The circuit 104 may be configured to receive a signal (e.g., PACKETS) from the transmitter 106. The signal PACKETS may comprise one or more information packets (or frames). The frames of the signal PACKETS may comprise one or more non-data FIS type Serial-ATA frames and/or one or more data FIS type Serial-ATA frames. However, other types of frames having predetermined sizes may be implemented similarly to meet the design criteria of a particular application.

The circuit 104 may be configured to generate a control signal (e.g., HOLD) to control the flow of the information packets from the transmitter circuit 106. The signal HOLD may be communicated to the transmitter 106 via, in one example, a back channel. The circuit 104 may have an output 108 that may present a signal (e.g., DIN) to an input 110 of the circuit 100 and an input 112 that may receive a signal (e.g., AF_FLAG) from an output 114 of the circuit 100. The circuit 104 may be configured to generate the signals DIN and HOLD in response to the signals PACKETS and AF_FLAG, respectively.

The circuit 100 may have an output 116 that may present a signal (e.g., DOUT) and an input 118 that may receive a signal (e.g., THRSHLD). The circuit 100 is generally configured to store information received via the signal DIN and present the stored information via the signal DOUT. In one example, the signals DIN and DOUT may be in different clock domains. The circuit 100 may be configured to present the signal AF_FLAG having a first state (e.g., asserted) in response to an amount of available storage being less than an anticipated size of the packet being received. In one example, a threshold for asserting the signal AF_FLAG may be set (or programmed) in response to the signal THRSHLD.

To save die area, the circuit 100 is generally implemented as small as possible, while still accounting for system latencies. For example, Serial-ATA bus latencies are defined to be up to 20 dwords. The circuit 100 is generally configured to receive up to twenty dwords after placing (or asserting) the signal HOLD on the Serial-ATA bus 107.

The minimum size of the circuit 100 is generally determined by the maximum bus latency (e.g., twenty dwords) and any internal latency (e.g., transmit and receive) of the device 102. An additional amount of memory is generally added to provide a threshold. The term threshold as used herein generally refers to the number of dwords that can be received without being removed from the back-end of the circuit 100 before sending the signal HOLD to the Serial-ATA bus. The threshold value is generally a direct trade off between cost and system throughput performance, generally measured in Megabytes/second. In one example, the threshold may be set to three dwords. However, other thresholds may be implemented to meet the design criteria of a particular application. Alternatively, the threshold may be programmable in response to the signal THRSHLD. When the threshold is three dwords, the device 102 may send a HOLD after receiving three dwords of an FIS.

Figure 3:
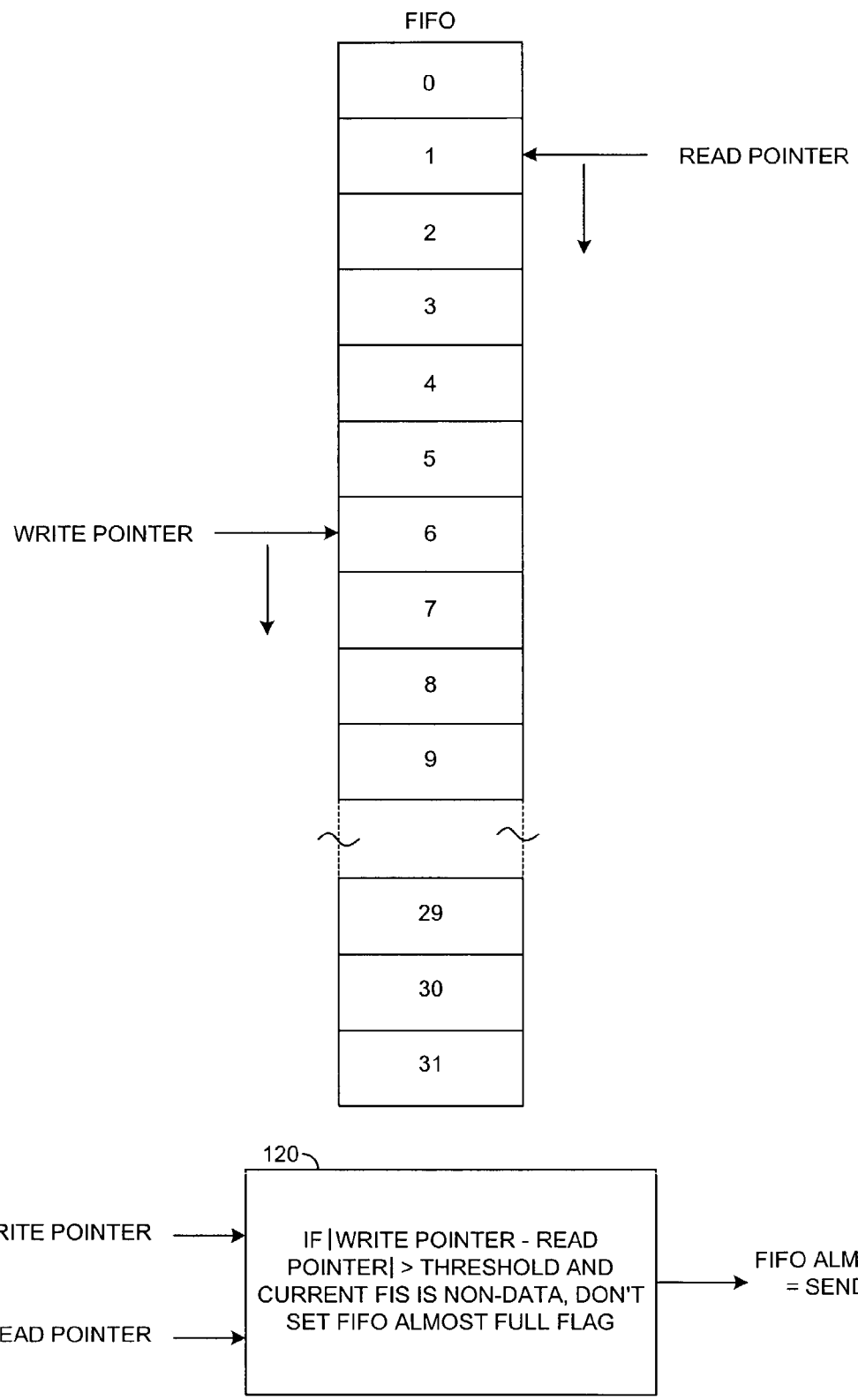
FIG. 3 is a data path diagram of the FIFO of FIG. 2.

Referring to FIG. 3, a block diagram illustrating an example data path in accordance with the present invention is shown. The circuit 100 may be implemented, in one example, as a 32 dword deep FIFO. A write pointer generally increases each time a dword is written into the circuit 100. A read pointer is generally increased each time a dword is read from the circuit 100. The read and write pointers generally wrap around when the last address of the circuit 100 is reached (e.g., when either of the pointers gets to address 31, the next address will be 0).

Compare logic 120 generally monitors the addresses of the read and write pointers. When the write pointer gets ahead of the read pointer by a predetermined threshold value and the incoming FIS is type DATA, the signal AF_FLAG is generally set to a first (or asserted) state (e.g., HIGH, or a logical "1"). A HOLD signal (or command) is generally sent to the transmitter 106 in response to the first state of the signal AF_FLAG. In response to the HOLD signal, the transmitter generally stops sending the current FIS to allow the read pointer to catch up. When there is room in the FIFO (e.g., the distance between the write and read pointers is less than or equal to the predetermined threshold), the signal AF_FLAG is generally cleared to a second state (e.g., a de-asserted state; LOW, or a logical "0") and the transmitter 106 is generally instructed to send more data. When the incoming FIS is of a non-DATA type, the signal AF_FLAG is generally not set even when the predetermined threshold is exceeded. Generally, the circuit 100 is sized such that incoming packets with a non-DATA type FIS easily fit into the FIFO (e.g., a non-data FIS type payload is generally smaller than the maximum bus latency).

Figure 4:
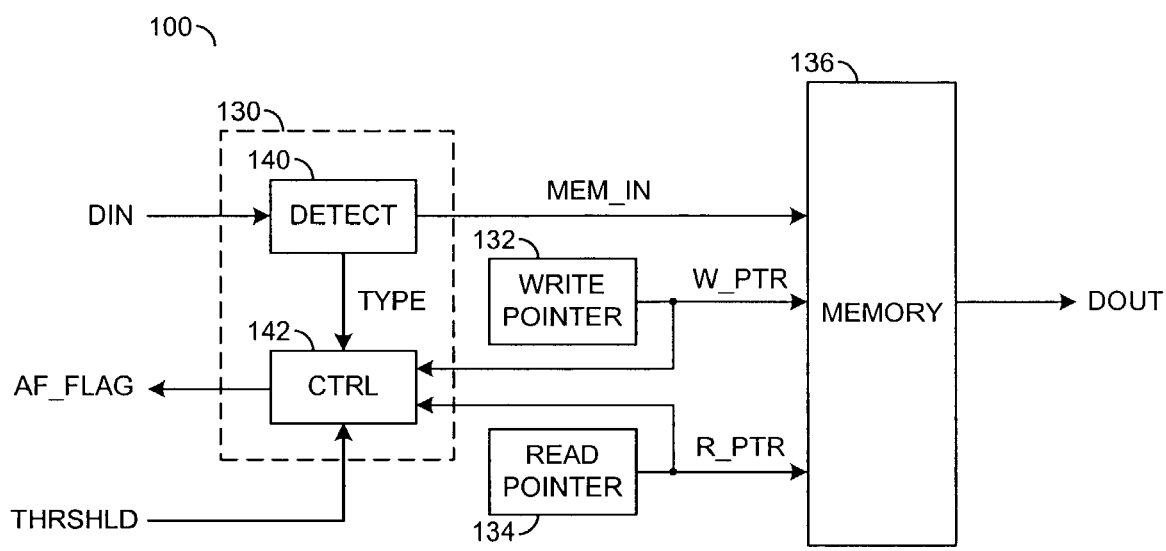
FIG. 4 is a more detailed block diagram of the FIFO of FIG. 1.

Referring to FIG. 4, a more detailed block diagram of a circuit 100 is shown in accordance with a preferred embodiment of the present invention. The circuit 100 may comprise a circuit 130, a circuit 132, a circuit 134 and a circuit 136. The circuit 130 may be implemented as a control circuit. The circuit 132 may be implemented as a write pointer logic. The circuit 134 may be implemented as a read pointer logic. The circuit 136 may be implemented as a memory circuit.

The circuit 130 may have a first input that may receive the signal DIN, a second input that may receive the signal THRSHLD, a third input that may receive a signal (e.g., W_PTR), a fourth input that may receive a signal (e.g., R_PTR), a first output that may present a signal (e.g., MEM_IN) and a second output that may present the signal AF_FLAG. The circuit 130 may be configured to generate the signals MEM_IN and AF_FLAG in response to the signals DIN, THRSHLD, W_PTR and R_PTR. For example, the circuit 130 may be configured to present the data contained within the signal DIN as the signal MEM_IN and the signal AF_FLAG in response to the signals THRSHLD, W_PTR; R_PTR and, in one example, the FIS type of the current information packet contained in the signal DIN. The circuit 130 may be configured to generate one or more status flags for the circuit 100.

The circuit 132 may have an output that may present the signal W_PTR. The signal W_PTR may be a write pointer. The signal W_PTR generally comprises an address value at which information in the signal MEM_IN is to be stored in the memory 136. The value of the signal W_PTR is generally incremented (or increased) each time information is stored. The value of the signal W_PTR generally wraps around to a first address from a last address of the circuit 100.

The circuit 134 may have an output that may present the signal R_PTR. The signal R_PTR may be a read pointer. The signal R_PTR generally comprises an address value at which information to be presented as the signal DOUT is read from the memory 136. The value of the signal R_PTR is generally incremented (or increased) each time information is read. The value of the signal R_PTR generally wraps around to a first address from a last address of the circuit 100.

The circuit 136 may be implemented as an array of memory cells. The memory cells may be arranged in rows and columns. In one example, the circuit 136 may be configured to have a width of 32 bits (e.g., 1 dword) and a depth determined by the system latencies and threshold. The circuit 136 may be configured to store information presented via the signal MEM_IN in response to a the signal W_PTR. The circuit 136 may be configured to generate the signal DOUT in response to the stored information and the signal R_PTR.

The circuit 130 may comprise a circuit 140 and a circuit 142. The circuit 140 may be implemented as a detector circuit. The circuit 142 may be implemented as a control circuit. The circuit 140 may be configured to detect the type field of an information packet contained in the signal DIN. In one example, the circuit 140 may be configured to copy a value from the type field for presentation to the circuit 142. Alternatively, the circuit 140 may be configured to generate a control signal that may indicate one or more characteristics (e.g., size, type, etc.) of the information packet in response to the contents of the type field. When the circuit 140 is configured to present a copy of the type field of the information packet, the circuit 142 is generally configured to determine one or more characteristics of the information packet in response to the contents of the type field. For example, a decoder or look-up table may be implemented to generate a control signal in response to the type field contents. The control signal may be implemented, for example, to either enable or disable (or inhibit) generation of the signal AF_FLAG.

The circuit 140 may have an input that may receive the signal DIN, an output that may present a signal (e.g., MEM_IN) and an output that may present a signal (e.g., TYPE). The circuit 140 may be configured to generate the signals MEM_IN and TYPE in response to the signal DIN. For example, the circuit 130 may be configured to present information contained within the signal DIN as the signal MEM_IN and a control signal (or value) representing, in one example, the FIS type of the current information packet as the signal TYPE. In one example, the signal TYPE may comprise a copy of the type field of the current information packet.

The circuit 142 may be, in one example, configured to generate one or more status flags for the circuit 100. The circuit 142 may have a first input that may receive the signal TYPE, a second input that may receive the signal W_PTR, a third input that may receive the signal R_PTR, a fourth input that may receive the signal THRSHLD and an output that may present the signal AF_FLAG. The circuit 142 is generally configured to generate the signal AF_FLAG in response to the signals TYPE, W_PTR, R_PTR and THRSHLD. For example, when an absolute difference between the value of the signal W_PTR and the value of the signal R_PTR is greater than a value of the signal THRSHLD (or a predetermined value), the circuit 142 may be configured to generate the signal AF_FLAG having (i) the asserted state in response to the signal TYPE having a value associated with packets that may be larger than the available space of the memory 136 (e.g., data FIS type packets, etc.) and (ii) the de-asserted state for packets that are known to be smaller than the available space of the memory 136 (e.g., non-data FIS type packets, etc.).

Figure 5:
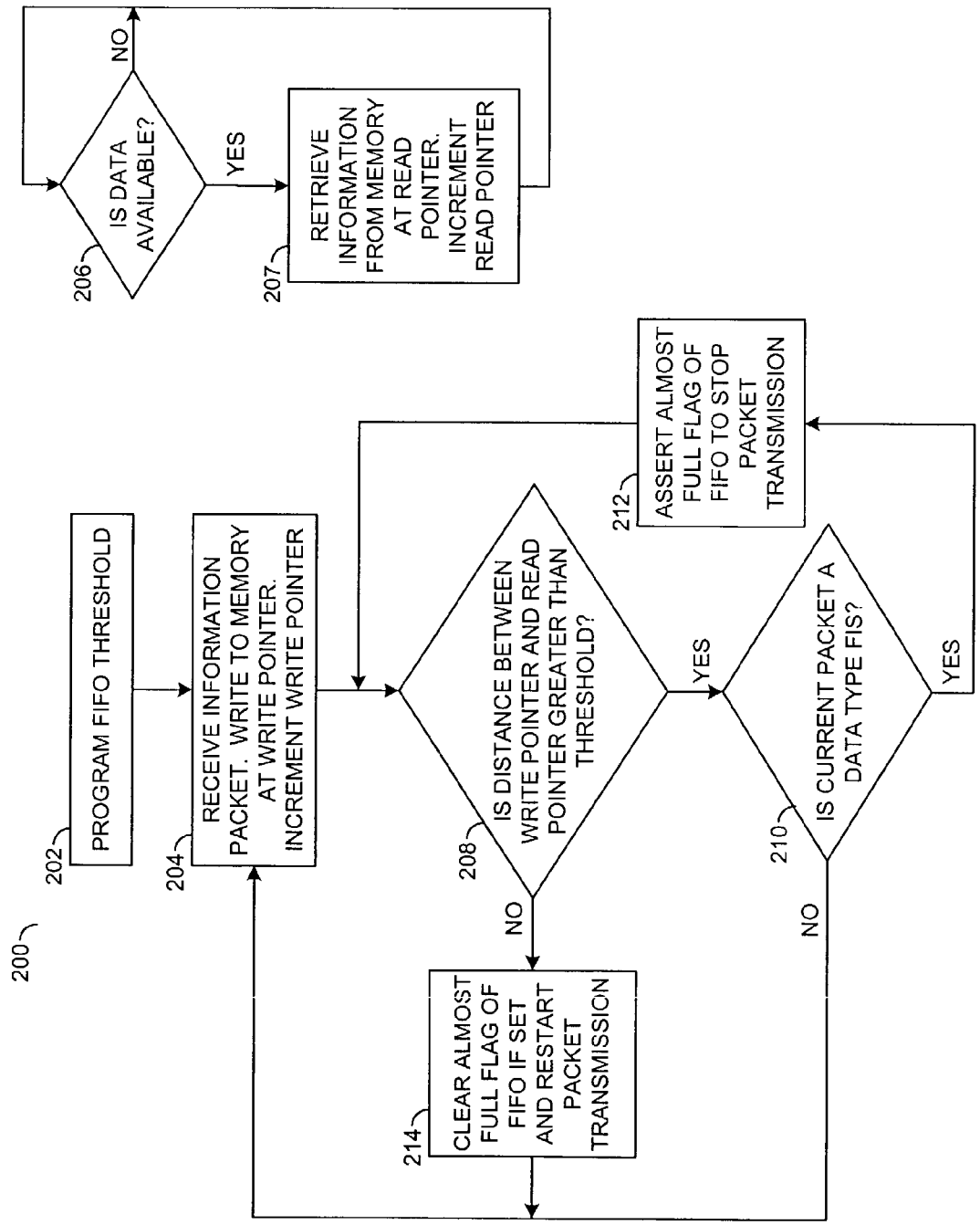
FIG. 5 is flow diagram of an example operation in accordance with a preferred embodiment of the present invention.

Referring to FIG. 5, a flow diagram 200 is shown illustrating an example operation in accordance with a preferred embodiment of the present invention. The threshold of the circuit 100 (e.g., a receive FIFO) may be set (or programmed) to a predetermined value (e.g., the block 202). Information received by the circuit 100 is generally stored according to a write pointer and the write pointer is incremented (e.g., the block 204). Independently of (or separate from) the storing operation, information is read from the circuit 100 according to a read pointer and the read pointer is incremented (e.g., the blocks 206 and 207). The distance between the write pointer and read pointer is generally compared (e.g., the block 208). When the distance between the write pointer and the read pointer is less than or equal to the predetermined threshold value, the circuit 100 generally continues receiving data (e.g., the NO pathway from the block 208). When the distance between the write pointer and the read pointer is greater than the predetermined threshold, the circuit 100 generally checks the type of information packet being received before setting an almost full flag (e.g., the YES path from the block 208 and the block 210).

When the type of information packet being received is known to be smaller than the available storage space (e.g., a non-data FIS type packet), the circuit 100 is generally configured to present the signal AF_FLAG in the de-asserted state and continue receiving the information packet (e.g., the NO path from the block 210). When the type of information packet being received may be or is known to be larger than the available storage space (e.g., a data FIS type packet), the circuit 100 is generally configured to present the signal AF FLAG having an asserted state (e.g. the block 212). The circuit 100 may be configured to send a signal (e.g., a HOLD command) to stop further transmission of the information packet until the distance between the read pointer and the write pointer is less than or equal to the predetermined threshold (e.g., the block 214).

The present invention generally provides an active threshold for FIFO flag assertion. A FIFO implemented in accordance with the present invention may be more cost effective than conventional solutions and use less silicon to produce. The present invention may be implemented on any FIFO that receives different predetermined sizes of information packets.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals.

The present invention may be implemented by the preparation of application specific integrated circuits (ASICs), field programmable gate arrays (FPGAs), or by interconnecting an appropriate network of conventional component circuits, as is described herein, modifications of which will be readily apparent to those skilled in the art(s).

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a first circuit configured to store input data in response to a write pointer and present output data in response to a read pointer, wherein said first circuit is further configured to (i) determine a type of an information packet containing said input data based upon a type field of said information packet and (ii) generate a first control signal based upon said type; and
a second circuit configured to generate a second control signal in response to said write pointer, said read pointer, a predetermined threshold and said first control signal, wherein said second circuit is further configured to generate said second control signal having (i) a first state in response to said write pointer and said read pointer being separated by a distance determined by said predetermined threshold and said information packet being a first type and (ii) a second state in response to said information packet being a second type.

2. The apparatus according to claim 1, wherein said first circuit comprises a first-in first-out memory and said second control signal comprises a flag.

3. The apparatus according to claim 1, wherein said second control signal comprises an almost full flag.

4. The apparatus according to claim 1, wherein said apparatus is configured to control a data flow in response to said second control signal.

5. The apparatus according to claim 1, wherein said input data comprises one or more types of information packets having predetermined sizes.

6. The apparatus according to claim 5, wherein said information packets comprise information indicative of said predetermined sizes.

7. The apparatus according to claim 6, wherein said first circuit is further configured to generate said first control signal in response to said information indicative of said predetermined sizes.

8. The apparatus according to claim 1, wherein:
said first circuit comprises (i) a first-in, first-out (FIFO) memory configured to store said input data in response to said write pointer and present said output data in response to said read pointer and (ii) a detector circuit configured to generate said first control signal in response to said type field of said information packet containing said input data.

9. The apparatus according to claim 1, wherein said second control signal comprises a handshaking signal of a communication channel.

10. The apparatus according to claim 9, wherein said communication channel comprises a link of a storage area network (SAN).

11. The apparatus according to claim 9, wherein said communication channel comprises a link between a storage device and a controller.

12. A method for actively adjusting a threshold of a first-in, first-out (FIFO) memory comprising the steps of:
receiving an information packet containing input data;
determining a type of said information packet;
storing said input data in response to a write pointer;
presenting output data in response to a read pointer; and
generating a control signal in response to said write pointer, said read pointer, a predetermined threshold and said type of said information packet containing said input data, wherein said control signal is generated having (i) a first state in response to said write pointer and said read pointer being separated by a distance determined by said predetermined threshold when said information packet comprises a data frame information structure type payload and (ii) a second state when said information packet comprises a non-data frame information structure type payload.

13. The method according to claim 12, wherein said determining step further comprises the step of:
   detecting a field of said information packet indicative of a size of said information packet.

14. The method according to claim 13, wherein said generating step further comprises the step of:
   enabling said control signal when said information packet size is larger than a predetermined size; and
   disabling said control signal when said information packet size is smaller than said predetermined size.

15. The method according to claim 13, wherein said generating step further comprises the step of:
   enabling said control signal when said information packet size is larger than a latency of said input data; and
   disabling said control signal when said information packet size is smaller than a latency of said input data.

16. The method according to claim 12, further comprising the step of:
   controlling a flow of one or more information packets on a communication channel in response to said control signal.

17. The method according to claim 12, wherein said generating step further comprises:
   controlling the state of said control signal in response to a type field of said information packet.

18. The method according to claim 17, wherein said controlling step comprises:
   enabling said control signal in response to one or more types of information packets.

19. The method according to claim 17, wherein said controlling step comprises:
   inhibiting said control signal in response to one or more types of information packets.

20. The method according to claim 12, wherein said control signal comprises an almost full flag.

21. A method for actively adjusting a threshold of a first-in, first-out (FIFO) memory comprising the steps of:
   receiving an information packet containing input data;
   determining a type of said information packet based upon detecting a field of said information packet indicative of a size of said information packet;
   storing said input data in response to a write pointer;
   presenting output data in response to a read pointer; and
   generating a control signal in response to said write pointer, said read pointer, a predetermined threshold and said type of said information packet containing said input data, wherein said control signal is enabled when said information packet size is larger than a predetermined size and disabled when said information packet size is smaller than said predetermined size.

22. A method for actively adjusting a threshold of a first-in, first-out (FIFO) memory comprising the steps of:
   receiving an information packet containing input data;
   determining a type of said information packet based upon detecting a field of said information packet indicative of a size of said information packet;
   storing said input data in response to a write pointer;
   presenting output data in response to a read pointer; and
   generating a control signal in response to said write pointer, said read pointer, a predetermined threshold and said type of said information packet containing said input data, wherein said control signal is enabled when said information packet size is larger than a latency of said input data and disabled when said information packet size is smaller than a latency of said input data.

* * * * *